United States Patent
Menjak et al.

(10) Patent No.: US 6,691,819 B2
(45) Date of Patent: Feb. 17, 2004

(54) ACTUATOR FOR ACTIVE FRONT WHEEL STEERING SYSTEM

(75) Inventors: Ratko Menjak, Frankenmuth, MI (US); James Myrl Card, Linwood, MI (US); Damir Menjak, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/953,929

(22) Filed: Sep. 17, 2001

(65) Prior Publication Data

US 2003/0051938 A1 Mar. 20, 2003

(51) Int. Cl.[7] .................................................. B62D 5/04
(52) U.S. Cl. ........................ 180/446; 180/444; 701/41
(58) Field of Search .............................. 180/444, 446, 180/402; 701/41, 42

(56) References Cited

U.S. PATENT DOCUMENTS

| | | | | |
|---|---|---|---|---|
| 4,741,409 A | * | 5/1988 | Westercamp et al. ....... | 180/413 |
| 4,837,692 A | * | 6/1989 | Shimizu ..................... | 701/41 |
| 5,040,629 A | * | 8/1991 | Matsuoka et al. .......... | 180/446 |
| 5,327,986 A | * | 7/1994 | Saita ......................... | 180/446 |
| 5,828,972 A | * | 10/1998 | Asanuma et al. ........... | 701/41 |
| 6,000,491 A | * | 12/1999 | Shimizu et al. ............ | 180/444 |
| 6,079,513 A | * | 6/2000 | Nishizaki et al. .......... | 180/402 |
| 6,343,671 B1 | * | 2/2002 | Ackermann et al. ....... | 180/444 |
| 6,367,577 B2 | * | 4/2002 | Murata et al. ............. | 180/446 |
| 6,394,218 B1 | * | 5/2002 | Heitzer ...................... | 180/402 |
| 6,470,994 B1 | * | 10/2002 | Shimizu et al. ............ | 180/446 |
| 6,488,115 B1 | * | 12/2002 | Ozsoylu et al. ............ | 180/444 |

* cited by examiner

*Primary Examiner*—Lesley D. Morris
*Assistant Examiner*—Daniel Yeagley
(74) *Attorney, Agent, or Firm*—Michael D. Smith

(57) ABSTRACT

A steering actuator for adjusting an angle of a steerable wheel of a motor vehicle includes an electronic controller, a rack translatable in opposing directions, and a sleeve assembly translatable along a length of the rack and disposed in mechanical communication with the steerable wheel of the vehicle. The rack is drivable in response to an operator input and further drivable in response to an input signal from the electronic controller. A method of using the actuator includes receiving an input from the operator of the vehicle, receiving an input signal indicative of the behavior of the vehicle from a sensing device, calculating an output signal from the operator input and the motor vehicle behavior input signal, and adjusting an angle of the steerable wheel based on the output signal.

15 Claims, 3 Drawing Sheets

ACTUATOR FOR ACTIVE FRONT WHEEL STEERING SYSTEM

BACKGROUND

Motor vehicle handling instabilities are generally a function of a combination of the yaw behavior of the motor vehicle and the motor vehicle speed. The yaw is caused by lateral movement of the motor vehicle and is most often the result of a combination of operator input and road surface conditions. Such lateral movement may occur in response to the oversteering of the motor vehicle by the operator. The encounter of the motor vehicle with an oversteer condition generally provides less than optimal handling of the motor vehicle.

SUMMARY

A steering actuator for adjusting an angle of a steerable wheel of a motor vehicle and a method for compensating for a limit handling situation are described herein. The steering actuator includes an electronic control unit, a rack translatable in opposing directions, and a sleeve assembly translatable along a length of the rack. The rack is drivable in response to an operator input and further drivable in response to a signal from the electronic control unit. The sleeve assembly is translatable along the rack in response to a signal indicative of motor vehicle behavior from the electronic control unit and is disposed in mechanical communication with the steerable wheel of the motor vehicle such that the translation of the rack or the translation of the sleeve assembly along the rack varies the angle of the steerable wheel to alter the direction of travel of the motor vehicle.

The method for compensating for the limit handling situation includes receiving an input from an operator of the motor vehicle, receiving an input signal indicative of the behavior of the motor vehicle from a sensing device, calculating an output signal from the operator input and the motor vehicle behavior input signal, and adjusting an angle of the steerable wheel based on the output signal.

DETAILED DESCRIPTION

Figure 1:
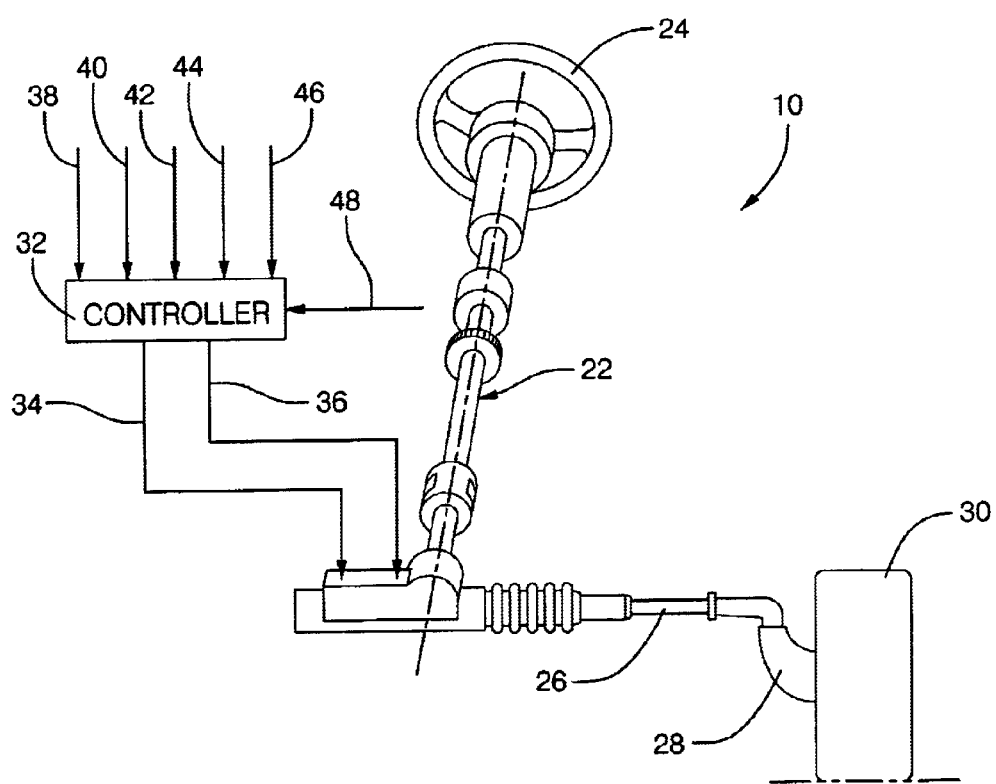
FIG. 1 is a schematic representation of a steering system of a motor vehicle.

Referring to FIG. 1, an exemplary embodiment of a steering system for a motor vehicle having front wheel steering capability is shown generally at 10. Steering system 10 is configured to provide for the active control of the steerability of the front steerable wheels of the motor vehicle (not shown) by mechanically adjusting an angle of the steerable wheels in response to sensed input parameters. Such active control compensates for the existence of a limit handling situation deduced from the sensed input parameters and is generally independent of the control exercisable by an operator of the motor vehicle. Oftentimes, depending upon the magnitude of the sensed input parameters, any compensatory action taken by steering system 10 is undetectable by the operator.

Steering system 10 comprises a front wheel steering actuator, shown generally at 20 and hereinafter referred to as "actuator 20," disposed at one end of a steering shaft, shown generally at 22. A hand steering device 24 accessible by the operator of the motor vehicle is disposed at an opposing end of steering shaft 22. Hand steering device 24 may be a steering wheel, as is shown. Upon rotation of hand steering device 24, steering shaft 22 rotates axially. The axial rotation of steering shaft 22 is converted into the linear movement of a tie rod 26 through a rack and pinion assembly (described below with reference to FIG. 2). The linear movement of tie rod 26 causes the pivotal movement of a steering knuckle 28 upon which a steerable wheel 30 is rotatably mounted. The pivotal movement of steerable wheel 30 allows the angle of steerable wheel 30 relative to a straight direction of travel to be varied, thereby allowing for the directional control of the motor vehicle.

Yaw control of the motor vehicle is provided to power steering system 10 through actuator 20. An electronic control unit 32 disposed in informational communication with actuator 20 receives sensed input parameters from various sensors operably mounted in the motor vehicle and provides a first output signal 34 and a second output signal 36 to actuator 20. The sensed input parameters to electronic control unit 32 include a vehicle velocity signal 38 from a vehicle velocity sensor (not shown), a lateral acceleration signal 42 from a lateral accelerometer (not shown), a steerable wheel angle signal 44 from a wheel angle sensor (not shown), and a yaw angular velocity signal 46 from a yaw rate sensor (not shown). Additionally, as hand steering device 24 is turned during a steering operation, an integrated torque/position sensor 60 (shown below with reference to FIG. 2) senses the torque applied to steering shaft 22 through hand steering device 24 to provide a torque signal 48 to electronic control unit 32. The torque/position sensor also senses a steering pinion gear angle and provides a steering gear angle signal 40 to electronic control unit 32. An analysis and quantification of signals 38, 40, 42, 44, 46, 48 enables electronic control unit 32 to derive output signals 34, 36 which are ultimately utilized to vary the angle of the steerable wheels 30 with respect to the straight direction of travel of the motor vehicle, thereby steering the motor vehicle and allowing the motor vehicle to maintain its stability during a limit handling condition, beyond which an oversteer condition may be experienced.

Figure 2:
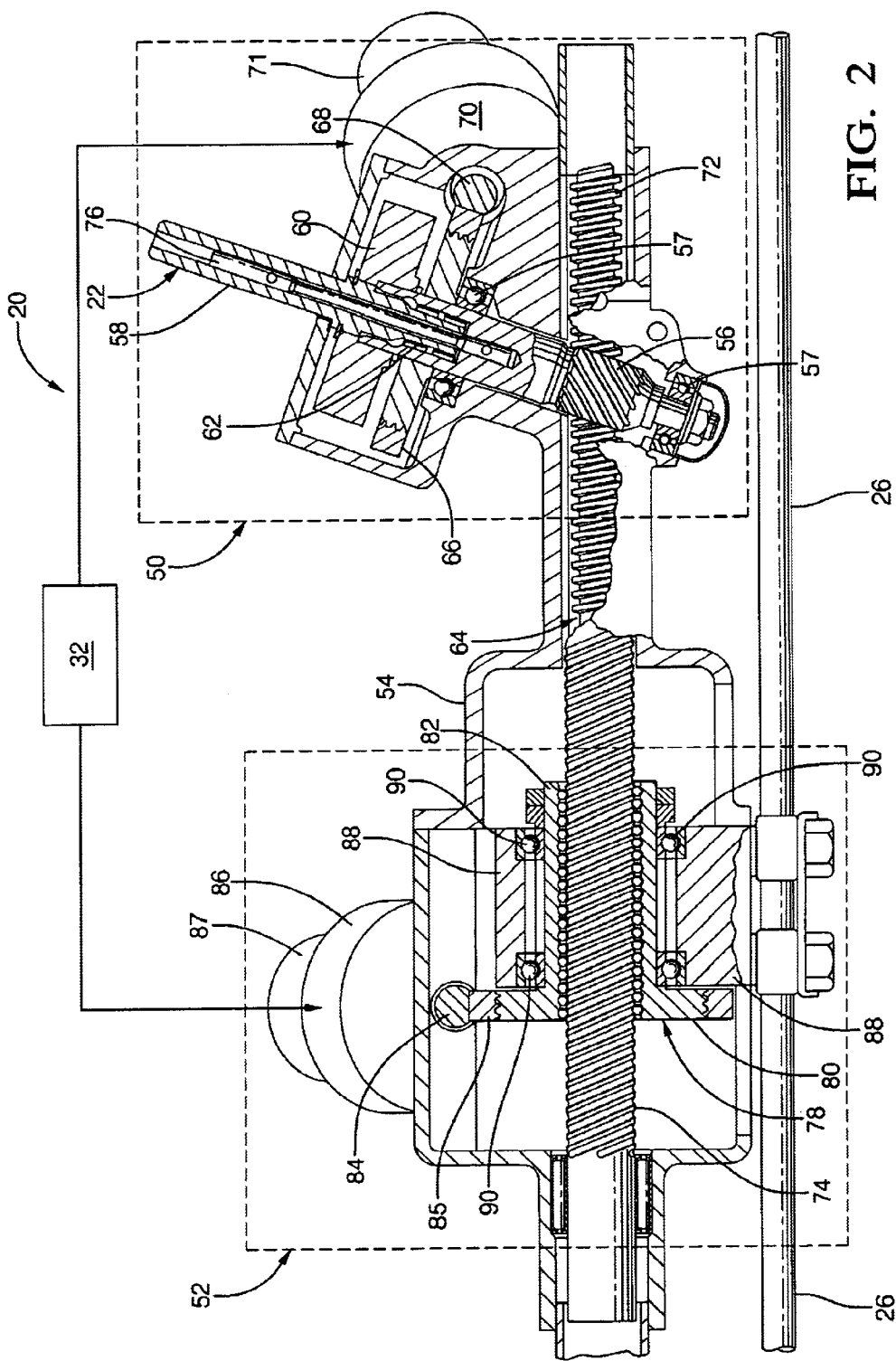
FIG. 2 is a sectional view of one embodiment of a front wheel steering actuator for adjusting an angle of a steerable wheel of a motor vehicle.

Referring now to FIG. 2, an exemplary embodiment of actuator 20 is shown. Actuator 20 comprises a rack and pinion assembly, shown generally at 50, and a sleeve assembly disposed in operable mechanical communication with rack and pinion assembly 50. Although the sleeve assembly may be any one of a myriad of different types of arrangements capable of converting a rotational motion into a linear motion, the sleeve assembly is hereinafter referred to as being a ball nut/screw assembly and is shown generally at 52. Both rack and pinion assembly 50 and ball nut/screw assembly 52 are supported in a housing 54. Electronic communication is maintained between rack and pinion assembly 50 and ball nut/screw assembly 52 via electronic control unit 32. Rack and pinion assembly 50 provides steerability to the motor vehicle partially in response to operator input, and ball nut/screw assembly 52 provides steerability to the motor vehicle in response to the sensed input parameters. Both rack and pinion assembly 50 and ball nut/screw assembly 52 provide steering communication to the steerable wheels of the motor vehicle via tie rods 26 operably connected to ball nut/screw assembly 52.

Steering shaft 22 is operably connected to rack and pinion assembly 50 through a pinion 56 disposed on a lower shaft portion 58 of steering shaft 22 and rotatably supported by bearings 57 within housing 54. The integrated torque/position sensor 60 is operably mounted on lower shaft portion 58 to measure the force with which the operator rotates the hand steering device to vary the angle of the steerable wheels. Splines, the faces of which are shown at 62, extend longitudinally along an outer cylindrically configured surface of lower shaft portion 58 and an inner cylindrically configured surface of pinion 56 to provide communication between lower shaft 58 and pinion 56.

Rack and pinion assembly 50 comprises a rack, shown generally at 64, pinion 56, a worm gear 66 disposed on pinion 56, a worm 68 disposed in mechanical communication with worm gear 66, and a rack drive motor 70 positioned to provide driving communication to worm 68. Rack 64 extends through housing 54 and comprises a first portion 72 at one end of rack 64 and a second portion 74 at an opposing end of rack 64. Rack 64 is mounted in housing 54 such that first portion 72 is engageable by pinion 56 and second portion 74 extends through ball nut/screw assembly 52. Rack drive motor 70 assists the lateral movement of rack 64 by driving worm gear 66 through worm 68 in response to the first output signal 34 from electronic control unit 32. Communication is maintained between pinion 56 and lower shaft portion 58 via a torsion bar 76 disposed axially therebetween. Torsion bar 76 is fixedly mounted on lower shaft portion 58 and rotatably disposed on pinion 56. A first magnetic stopping device 71 associated with rack drive motor 70 provides a resistance to rack drive motor 70 to maintain rack 64 in a driver-defined position. First magnetic stopping device 71 also prevents or minimizes any back-drivability of actuator 20 that may be experienced from movement of the motor vehicle in lateral directions.

Ball nut/screw assembly 52 comprises a ball nut, shown generally at 78, and second portion 74 of rack 64 extending through ball nut 78. Ball nut 78 comprises a flange 80 and a body 82. Flange 80 includes a peripheral edge configured to receive a worm 84, disposed in mechanical communication with worm gear 85, drivable by a ball nut drive motor 86 upon ball nut drive motor 86 receiving the second output signal 36 from electronic control unit 32, where the worm gear 85 is drivable by the worm 84. Body portion 82 includes a tie rod support sleeve 88 rotatably supported thereon by bearings 90 and extending through an opening (not shown) in housing 54. Tie rod support sleeve 88 is positioned to receive tie rods 26, the opposing ends of which include the steerable wheels rotatably mounted thereon. A second magnetic stopping device 87 associated with ball nut drive motor 86 provides resistance to ball nut drive motor 86 to maintain ball nut 78 in a position defined by electric control unit 32 and, in a manner similar to that of first magnetic stopping device 71, prevents or minimizes the back-drivability of actuator 20 that may be experienced from the lateral movement of the motor vehicle.

The operation of steering system 10 into which actuator 20 is incorporated is described with reference to both FIGS. 1 and 2. The active control of the steerability of the motor vehicle as provided by actuator 20 is the result of either the cooperable communication of a first steering mode and a second steering mode or the independent operations of the first and second steering modes. The first steering mode is determined from a combination of operator input parameters and the sensed inputs from the various sensors that receive information in response to the behavior of the motor vehicle. As the operator rotates hand steering device 24, steering shaft 22 is correspondingly rotated, which in turn causes the corresponding rotation of torsion bar 76. The torque applied to torsion bar 76 through steering shaft 22 is measured by torque/position sensor 60 and is transmitted as torque signal 48 to electronic control unit 32. Steering pinion gear angle signal 40 is also transmitted from torque/position sensor 60 disposed on pinion 56 to electronic control unit 32. Both torque signal 48 and steering pinion gear angle signal 40 (as well as other signals including, but not being limited to, vehicle velocity signal 38) are algorithmically manipulated to generate first output signal 34. First output signal 34 is received by rack drive motor 70, which, based on the magnitude of first output signal 34, drives worm 68 and worm gear 66 to rotate pinion 56 to the position selected by the operator, thereby moving rack 64 and steering the motor vehicle.

The second steering mode is determined solely from sensed inputs from the various sensors that receive information in response to yaw behavior variations of the motor vehicle. The sensed inputs generally comprise yaw angular velocity signal 46 and lateral acceleration signal 42. Other signals including, but not being limited to, vehicle velocity signal 38 may be utilized with yaw angular velocity signal 46 and lateral acceleration signal 42. As the motor vehicle experiences a yaw moment, yaw angular velocity signal 46 from the yaw rate sensor and lateral acceleration signal 42 from the lateral accelerometer are provided to electronic control unit 32 where they are algorithmically manipulated to generate second output signal 36. Second output signal 36 is received by ball nut drive motor 86, which, based on the magnitude of second output signal 36, drives worm 84 to rotate ball nut 78 to the appropriate position as determined by electronic control unit 32. Rotation of ball nut 78 causes the movement of tie rod support sleeve 88 upon which tie rods 26 are disposed, thereby causing the movement of tie rods 26 and the angling of steerable wheels 30. Such an angling of steerable wheels 30 is generally about two degrees to about six degrees from the direction of travel of the motor vehicle. The sensitivities of both the yaw rate sensor and the lateral accelerometer may be adjusted such that minute yaw moments can be detected and corrected by steering system 10 and such that the detections and corrections are unnoticeable by the operator of the motor vehicle. By adjusting the sensitivities of the yaw rate sensor and the lateral accelerometer in such a manner, roadfeel attributable to variations in the road surface that cause the steerable wheels to "pull" to one side or the other may be eliminated or at least substantially minimized.

If, on the other hand, more aggressive variations in the yaw behavior of the motor vehicle are experienced that have the potential for developing into either oversteer or understeer conditions, both the first steering mode and the second steering mode function in an operation electronically coordinated by electronic control unit 32 to enable the motor vehicle to recover and maintain its direction of travel as intended by the operator. During such an experience, although as the operator rotates hand steering device 24 and various signals are algorithmically manipulated to generate first output signal 34, various other inputs from the yaw rate sensor and from the lateral accelerometer are also provided to electronic control unit 32 where they are algorithmically manipulated to generate second output signal 36 simultaneously with first output signal 34. In the event that opposing input signals are received by electronic control unit 32 (e.g., a yaw angular velocity signal indicative of extreme movement of the motor vehicle in a lateral direction and an operator input signal indicative of a desire to move the motor vehicle in a direction not compensatory to the extreme lateral movement) and opposing output signals 34, 36 are generated, electronic control unit 32 compensates for the opposing output signals 34, 36 transmitted to motors 70, 86 by causing ball nut drive motor 86 to operate at an increased speed to overcome the effect of first output signal 34, thereby virtually negating the input of the operator and maintaining a direction of travel sufficient to avoid or minimize the probability that an oversteer or understeer condition will be encountered.

An application of a combination of both the first and second steering modes can provide variable steerability of the motor vehicle in specific low-speed operator-controlled situations. For example, during parking, actuator 20 can be configured to angle the steerable wheels of the motor vehicle beyond the angles typically required for higher speed operations. In such a maneuver, torque signal 48 and steering pinion gear angle signal 40 are analyzed in conjunction with vehicle velocity signal 38 to generate first output signal 34 and second output signal 36. First output signal 34 provides for the movement of rack 64 in a particular direction in accordance with the input as dictated by the operator. Second output signal 36 provides for a corresponding movement of rack 64 to increase the angle of steerable wheels 30 beyond the angle determined from first output signal 34 and required during normal driving operation of the motor vehicle. By providing for the increased angle, the maneuverability of the motor vehicle is significantly enhanced.

Figure 3:
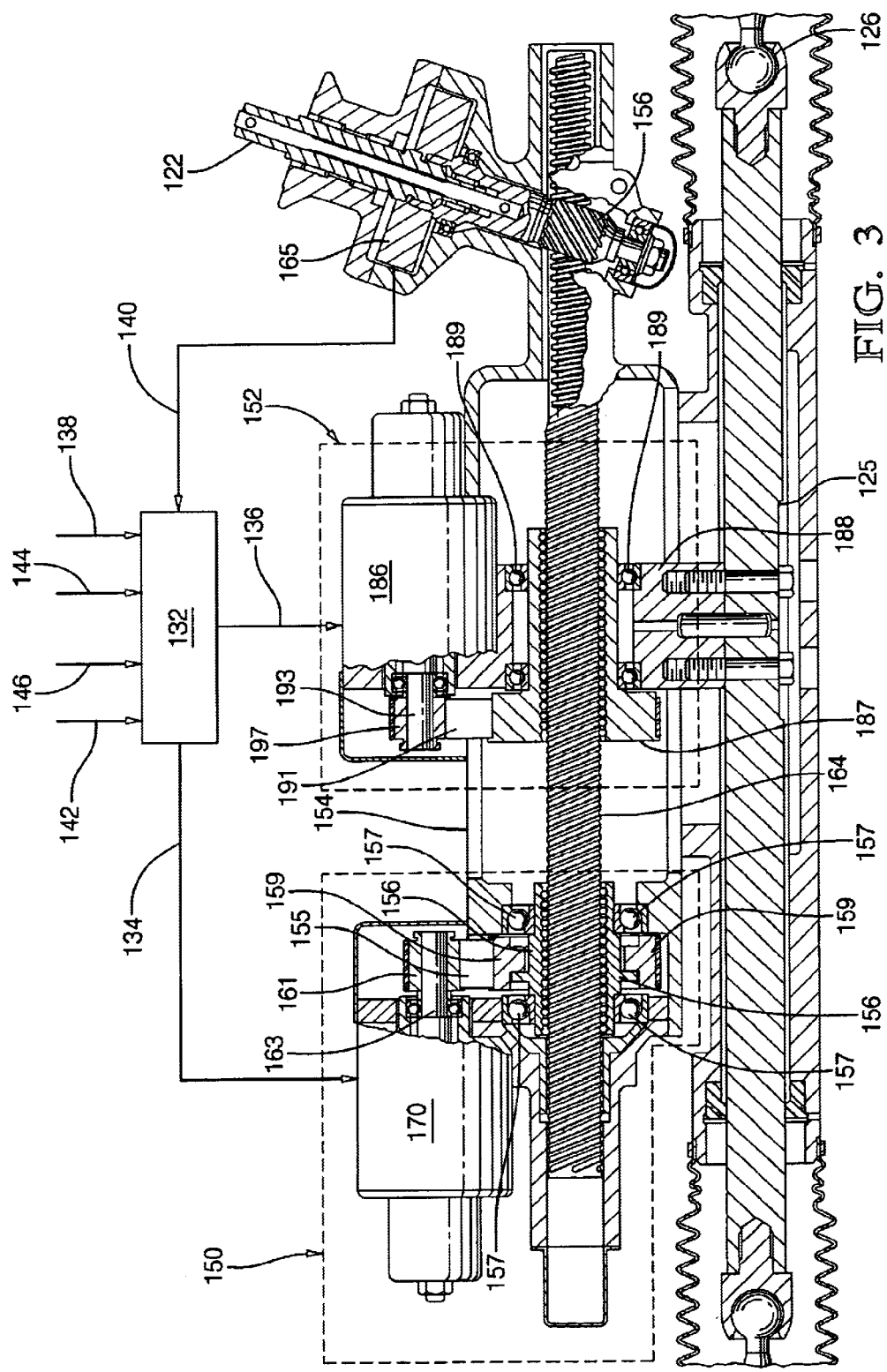
FIG. 3 is a sectional view of another embodiment of a front wheel steering actuator for adjusting an angle of a steerable wheel of a motor vehicle.

Referring now to FIG. 3, another exemplary embodiment of a front wheel steering actuator for use in a steering system of a motor vehicle is shown generally at 120 and is hereinafter referred to as "actuator 120." An electronic control unit 132 disposed in informational communication with actuator 120 receives input signals from various sensors operably mounted in the motor vehicle and provides a first output signal 134 to a rack drive motor 170 and a second output signal 136 to a ball nut drive motor 186. The input signals to electronic control unit 132 include a vehicle velocity signal 138 from a vehicle velocity sensor (not shown), a steering pinion gear angle signal 140 from a position sensor 165, a lateral acceleration signal 142 from a lateral accelerometer (not shown), a steerable wheel angle signal 144 from a wheel angle sensor (not shown), and a yaw angular velocity signal 146 from a yaw rate sensor (not shown). A torque sensor (not shown) may also be incorporated into the steering system to sense the torque applied to the hand steering device by the operator and provide a torque signal (not shown) to electronic control unit 132. Upon an analysis and quantification of all of the input signals, electronic control unit 132 derives output signals 134, 136, which are ultimately utilized by motors 170, 186 to alter the angle of the steerable wheels, thereby maintaining the stability of the motor vehicle at a limit handling condition beyond which an oversteer condition may be experienced.

Actuator 120 comprises a rack, shown generally at 164, a rack driver, shown generally at 150, disposed on rack 164, and a sleeve assembly, which may be a ball nut/screw assembly, shown generally at 152, disposed on rack 164. Rack 164 is configured to be drivable in response to the rotation of a pinion 156 operably disposed on a steering shaft, shown generally at 122, and can be drivingly assisted through the operation of rack driver 150. Rack driver 150 provides driving assist of the steerability of the motor vehicle in a manner similar to the rack and pinion assembly described with reference to FIGS. 1 and 2 to alter the angle of the steerable wheels in order to change the direction of travel of the motor vehicle. Rack driver 150, however, in contrast to the rack and pinion assembly of FIGS. 1 and 2, provides for the translational drivability of rack 164 via a belt/pulley system.

Rack driver 150 comprises rack drive motor 170 and a driving nut 156 rotatably supported within a housing 154 by bearings 157. Driving nut 156 is driven by a belt 155 that provides driving communication between a first pulley 159 disposed on an outer surface of driving nut 156 and a second pulley 161 disposed on a rotor shaft 163 of rack drive motor 170. Such driving communication causes the axial rotation of driving nut 156, which assists pinion 156 in causing the movement of rack 164.

Ball nut/screw assembly 152 is disposed in operable mechanical communication with rack driver 150 through rack 164, which extends laterally through both ball nut/screw assembly 152 and rack driver 150. Ball nut/screw assembly 152 comprises ball nut drive motor 186 and a ball nut 187 rotatably supported in housing 154 by bearings 189. Rack 164 extends laterally through ball nut 187 and is received in driving nut 156 of rack driver 150. Ball nut/screw assembly 152 is driven by a belt 191 looped around ball nut 187 and a pulley 197 on a rotor shaft 193 of ball nut drive motor 186. Alternately, belt 191 may be looped around pulley 197 on rotor shaft 193 and a pulley (not shown) disposed at or integrally formed with ball nut 187. In either embodiment, a support sleeve 188 is rotatably supported on ball nut 187 by bearings 189, and a drag link 125 is disposed on support sleeve 188. One end of each tie rod 126 is pivotally received by drag link 125, while the opposing end of each tie rod 126 provides mechanical communication to an associated steerable wheel (not shown). Drag link 125 is laterally translatable with the corresponding movement of support sleeve 188 on ball nut 187 to vary the angle of each of the steerable wheels.

The operation of the steering system into which actuator 120 is incorporated is substantially similar to that disclosed above with reference to FIGS. 1 and 2. In particular, actuator 120 provides for the active control of the steerability of a motor vehicle through first and second steering modes. As above, the first steering mode is determined from a combination of operator input parameters and sensed inputs from the various sensors that receive information in response to the behavior of the motor vehicle and can be independent of or cooperable with the second steering mode, which, as above, is determined solely from sensed inputs from the various sensors. Both steering modes are utilized to provide the motor vehicle with optimum steerability during situations in which oversteer and understeer conditions are encountered as well as during low-speed operator-controlled situations such as parking.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A steering actuator for mechanically adjusting an angle of a steerable wheel of a motor vehicle, the steering actuator comprising:

an electronic control unit;

a rack drivable in response to an operator input;

a rack and pinion assembly, the rack and pinion assembly including a pinion operably engaged with the rack, the pinion providing driving communication to the rack in response to the operator input, the rack and pinion assembly further including a rack driving motor disposed in operable mechanical communication with the pinion, the rack driving motor providing power assist to the driving of the rack through the pinion upon receiving a first signal from the electronic control unit;

a sleeve assembly translatable along a length of said rack, said sleeve assembly including a sleeve assembly drive motor disposed in operable mechanical communication with the sleeve assembly and providing driving communication to said sleeve assembly, said sleeve assembly being translatable in response to a second signal indicative of the behavior of the motor vehicle from said electronic control unit, said sleeve assembly being disposed in mechanical communication with the steerable wheel of the motor vehicle such that the translation of said rack or the translation of said sleeve assembly along said rack varies the angle of the steerable wheel with respect to a direction of travel of the motor vehicle;

a first stopping device associated with the rack drive motor for providing resistance to the rack drive motor; and, a second stopping device associated with the sleeve assembly drive motor for providing resistance to the sleeve assembly drive motor.

2. The steering actuator of claim 1 further comprising a support member disposed in communication with said sleeve assembly, said support member being operably connected to the steerable wheel of the motor vehicle.

3. The steering actuator of claim 1 further comprising a worm gear disposed on said sleeve assembly, said worm gear being drivable by a worm disposed in operable communication with said sleeve assembly drive motor.

4. The steering actuator of claim 1 further comprising a pulley disposed on said sleeve assembly, said pulley being drivable by said sleeve assembly drive motor.

5. The steering actuator of claim 1 wherein said sleeve assembly is a hail nut/screw assembly.

6. The steering actuator of claim 1 wherein the electronic control unit receives a lateral acceleration signal.

7. The steering actuator of claim 1 wherein the electronic control unit receives a yaw angular velocity signal.

8. The steering actuator of claim 1 wherein the electronic control unit receives a vehicle velocity signal.

9. The steering actuator of claim 1 wherein the electronic control unit receives a steering gear angle signal.

10. The steering actuator of claim 1 wherein the electronic control unit receives a steerable wheel angle signal.

11. A steering actuator for mechanically adjusting an angle of a steerable wheel of a motor vehicle, the steering actuator comprising:

an electronic control unit;

a rack drivable in response to an operator input;

a rack and pinion assembly, the rack and pinion assembly including a pinion operable engaged with the rack, the pinion providing driving communication to the rack in response to the operator input, the rack and pinion assembly further including a rack driving motor disposed in operable mechanical communication with the pinion, the rack driving motor providing power assist to the driving of the rack through the pinion upon receiving a first signal from the electronic control unit;

wherein a torque signal and a pinion gear angle signal are used by the electronic control unit to drive the first signal and, a sleeve assembly translatable along a length of said rack, said sleeve assembly including a sleeve assembly drive motor disposed in operable mechanical communication with the sleeve assembly and providing driving communication to said sleeve assembly, said sleeve assembly being translatable in response to a second signal indicative of the behavior of the motor vehicle from said electronic control unit, wherein a yaw angular velocity signal and a lateral acceleration signal are used by the electronic control unit to derive the second signal, said sleeve assembly being disposed in mechanical communication with the steerable wheel of the motor vehicle such that the translation of said rack or the translation of said sleeve assembly along said rack varies the angle of the steerable wheel with respect to a direction of travel of the motor vehicle.

12. A steering actuator comprising:

an electronic control unit;

a pinion operably disposed on a steering shaft;

a rack drivable in response to rotation of the pinion;

a rack drive motor for assisting the pinion in movement of the rack when in receipt of a first signal from the electronic control unit, wherein the first signal includes at least one of a torque and a pinion gear angle signal;

a sleeve assembly positioned about the rack; and, a sleeve assembly drive motor for rotating the sleeve assembly when in receipt of a second signal from the electronic control unit, wherein the second signal is indicative of yaw behavior variations and includes at least one of a yaw angular velocity signal and a lateral acceleration signal, wherein the steering actuator is operable in any one of a first mode where the electronic control unit sends only the first signal, a second mode wherein the electronic control unit sends only the second signal, and a third mode wherein the electronic control unit sends both the first signal and the second signal.

13. The steering actuator of claim 12 further comprising a support sleeve disposed in communication with said sleeve assembly, said support sleeve being operably connected to a steerable wheel of the motor vehicle.

14. A Steering actuator comprising:

an electronic control unit;

pinion operably disposed on a steering shaft;

a rack drivable in response to rotation of the pinion;

a rack drive motor for assisting the pinion in movement of the rack when in receipt of a first signal from the electronic control unit;

a ball nut positioned about the rack; and, a ball nut drive motor for rotating the ball nut when in receipt of a second signal from the electronic control unit;

a first stopping device associated with the rack drive motor for providing resistance to the rack drive motor; and, a second stopping device associated with the ball nut drive motor for providing resistance to the sleeve assembly drive motor, wherein the steering actuator is operable in any one of a first mode where the electronic control unit sends only the first signal, a second mode wherein the electronic control unit sends only the second signal, and a third mode wherein the electronic control unit sends both the first signal and the second signal.

15. A steering actuator comprising:

an electronic control unit;

a pinion operably disposed on a steering shaft;

a rack drivable in response to rotation of the pinion;

a rack drive motor for assisting the pinion in movement of the rack when in receipt of a first signal from the electronic control unit, wherein the first signal is derived from signals including a torque signal and a steering pinion gear angle signal received by the electronic control unit;

a ball nut positioned about the rack; and, a ball nut drive motor rotating the ball nut when in receipt of a second signal from the electronic control unit, wherein the second signal is derived from signals including yaw angular velocity signal and lateral acceleration signal received by the electronic control unit, wherein the steering actuator is operable in any one of a first mode where the electronic control unit sends only the first signal, a second mode wherein the electronic control unit sends only the second signal, and a third mode wherein the electronic control unit sends both the first signal and the second signal.

* * * * *